United States Patent
Eschborn et al.

(10) Patent No.: US 7,251,550 B2
(45) Date of Patent: Jul. 31, 2007

(54) AIRCRAFT ACCESSORY MONITOR

(75) Inventors: David M. Eschborn, Gilbert, AZ (US); Paul S. Evans, Mesa, AZ (US); Casey Hanlon, Queen Creek, AZ (US); Calvin C. Potter, Mesa, AZ (US); Glenn H. Lane, Chandler, AZ (US); Gary A. Farnsworth, Scottsdale, AZ (US); Louie T. Gaines, Phoenix, AZ (US); David M. Mathis, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 12 days.

(21) Appl. No.: 10/677,567

(22) Filed: Oct. 1, 2003

(65) Prior Publication Data

US 2005/0075769 A1  Apr. 7, 2005

(51) Int. Cl.
*G06F 7/00* (2006.01)
(52) U.S. Cl. .................... 701/29; 701/30; 701/31; 340/945; 73/788; 73/801; 455/431; 455/507
(58) Field of Classification Search ........... 340/945; 73/788, 801; 455/431, 507
See application file for complete search history.

(56) References Cited

U.S. PATENT DOCUMENTS

| | | | |
|---|---|---|---|
| 3,946,364 A | | 3/1976 | Codomo et al. |
| 4,028,536 A | * | 6/1977 | Woodward ................ 714/820 |
| 4,723,518 A | * | 2/1988 | Kawasaki et al. ....... 123/188.8 |
| 4,763,285 A | * | 8/1988 | Moore et al. ................ 701/14 |
| 4,787,053 A | | 11/1988 | Moore |
| 4,788,531 A | | 11/1988 | Corwin et al. |
| 4,908,775 A | | 3/1990 | Palusamy et al. |
| 4,964,125 A | * | 10/1990 | Kim ............................ 714/26 |
| 5,033,010 A | | 7/1991 | Lawrence et al. |
| 5,050,081 A | | 9/1991 | Abbott et al. |
| 5,079,707 A | * | 1/1992 | Bird et al. ................... 701/35 |

(Continued)

FOREIGN PATENT DOCUMENTS

EP  0 322 158 A2  6/1989

(Continued)

OTHER PUBLICATIONS

Unknown author, Advisory Circular—Airframe guide for certification of part 23 airplanes, date Jan. 27, 2003 by US Department of Transportation—Federal Aviation Adminstration.*

*Primary Examiner*—Cuong Nguyen
(74) *Attorney, Agent, or Firm*—Ingrassia Fisher & Lorenz (57) ABSTRACT

Methods and apparatus are provided for monitoring an aircraft accessory. The apparatus comprises a processor associated with said aircraft accessory, a transducer coupled to said processor and operable to produce parametric data relating to said aircraft accessory and a memory coupled to said processor having baseline parametric data residing therein, wherein said baseline parametric data comprises the parametric data obtained during an acceptance test procedure. The method comprises installing a transducer configured to produce parametric data relating to said aircraft accessory, coupling said transducer to a processor associated with said aircraft accessory, coupling said processor to a memory associated with said aircraft accessory, recording baseline parametric data relating to said aircraft accessory in said memory during an acceptance test procedure for said aircraft accessory.

32 Claims, 7 Drawing Sheets

U.S. PATENT DOCUMENTS

| | | | |
|---|---|---|---|
| 5,260,874 A * | 11/1993 | Berner et al. ............... 701/33 |
| 5,500,797 A | 3/1996 | Noger |
| 5,666,111 A * | 9/1997 | Servat et al. .............. 340/980 |
| 5,671,141 A | 9/1997 | Smith et al. |
| 5,816,530 A * | 10/1998 | Grube ...................... 244/1 R |
| 6,115,656 A | 9/2000 | Sudolsky |
| 6,122,575 A | 9/2000 | Schmidt et al. |
| 6,295,488 B1 | 9/2001 | Longere |
| 6,408,258 B1 | 6/2002 | Richer |
| 6,688,308 B1 * | 2/2004 | Phillips et al. ......... 128/204.22 |
| 6,744,401 B2 * | 6/2004 | Hager et al. ............... 342/173 |
| 6,965,816 B2 * | 11/2005 | Walker ..................... 701/16 |
| 2002/0016654 A1 | 2/2002 | Ing et al. |
| 2002/0035416 A1 | 3/2002 | De Leon |
| 2003/0093187 A1 * | 5/2003 | Walker ........................ 701/1 |
| 2003/0144969 A1 * | 7/2003 | Coyne ....................... 705/400 |
| 2004/0106404 A1 * | 6/2004 | Gould et al. ............... 455/431 |
| 2005/0075769 A1 * | 4/2005 | Eschborn et al. ............ 701/29 |

FOREIGN PATENT DOCUMENTS

| | | |
|---|---|---|
| EP | 1 280 316 A2 | 1/2003 |
| EP | 1426870 A2 * | 6/2004 |
| WO | WO 02/08057 A1 | 1/2002 |
| WO | WO 03/056284 A2 | 7/2003 |
| WO | PCT/US2004/032651 | 10/2005 |

\* cited by examiner

AIRCRAFT ACCESSORY MONITOR

TECHNICAL FIELD

The present invention generally relates to aircraft maintenance, and more particularly relates to real-time monitoring of aircraft engine accessories to predict maintenance and logistical requirements.

BACKGROUND

Substantial costs can be incurred by aircraft owners and operators due to periods of aircraft unavailability, or downtime. Aircraft down-time is sometimes related to aircraft engine system down-time. The aircraft engine system includes the engine and engine accessories, such as a starter or a generator. To reduce the likelihood and/or frequency of costs and downtime, preventive maintenance programs have been implemented.

Preventive maintenance is periodically performed on aircraft engine accessories based upon average wear rates, lubricant usage rates, and similar averages. Variable burdens on aircraft and their components due to loads, weather, and various other factors inevitably mean that some aircraft parts will wear at differential rates than others. Worn parts can lead to aircraft down-time.

In addition to maintenance, logistical support for aircraft engines, such as production and distribution of spare parts and lubricants, can also impact downtime. Unavailability of spare parts and lubricants can extend down-time.

Some mathematical methods for predicting maintenance and logistical requirements are known in the art. However, these methods require data regarding wear and consumption rates that may be only forensically known, either after expensive operational failures or expensive testing programs.

Some methods of gathering useful data are known, but are conventionally adapted to laboratory and test facility use. Some real-time data gathering methods are also known, such as sensing oil pressure, oil temperature, and shaft speed. However, systems for real-time data collection for real-time data analysis and real-time prediction of maintenance and logistical requirements have eluded the industry.

Accordingly, it is desirable to minimize aircraft accessory downtime. In addition, it is desirable to predict preventive maintenance requirements and logistical requirements to minimize downtime. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for monitoring an aircraft accessory. The apparatus comprises a processor associated with said aircraft accessory, a transducer coupled to said processor and operable to produce parametric data relating to said aircraft accessory and a memory coupled to said processor having baseline parametric data residing therein, wherein said baseline parametric data comprises the parametric data obtained during an acceptance test procedure;

A method is provided for monitoring an aircraft accessory. The method comprises recording, in a memory coupled to a processor coupled to sensors adapted to gather data relating to the aircraft accessory, baseline parametric data produced by the processor from the data gathered by the one or more sensors during operation of the aircraft accessory while undergoing an acceptance test procedure and comparing, in the processor and during operation of the aircraft accessory in an aircraft, real-time operational parametric data produced by the coupled processor from the data gathered by the one or more sensors with the baseline parametric data.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Although described as implemented in an aircraft turbine starter (ATS), the present invention also applies to various other aircraft accessories include, without limitation, starters, auxiliary power units, valves, hydraulic pumps, and actuators generally. Aircraft accessories support the operation of various aircraft systems including engines and thrust reverser systems. Furthermore, there is no intention to be bound by any expressed or implied theory presented in the preceding technical field, background, brief summary or the following detailed description.

Figure 1:
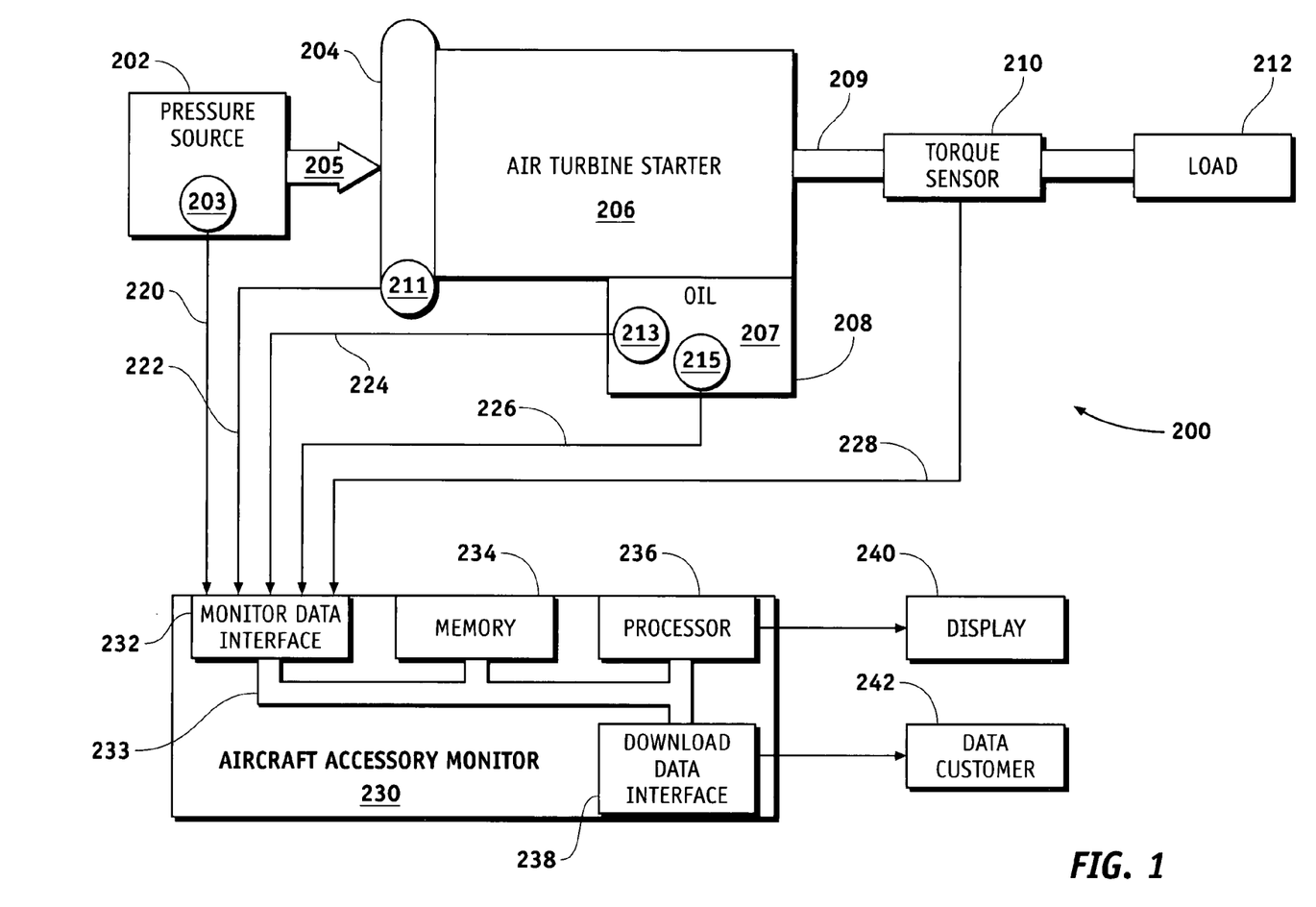
FIG. 1 is a diagram of an exemplary apparatus for monitoring an aircraft accessory.

Turning now to the description, FIG. 1 depicts a simplified block diagram of an exemplary accessory monitor 230 configured to monitor an exemplary aircraft accessory 206, which in this case is an air turbine starter 206. The air turbine starter 206 is adapted to receive compressed air 205 from compressed air source 202. The compressed air 205 is supplied to the turbine vanes 204, which are mounted rotationally in the air turbine starter 206. The pressure of the compressed air 205 is sensed by a pressure sensor 203, which is coupled to a monitor data interface 232 of the aircraft accessory monitor 230 by a communications channel 220. One or more parameters associated with the turbine vanes 204 such as, for example, strain forces on selected vanes, rotational speed, or rotational acceleration, may be monitored. In the depicted embodiment, the rotational speed of the turbine vane 204 is sensed by sensor 211, such as, for example, a tachometer, which is coupled to the monitor data interface 232 by communications channel 222. Various other parameters associated with the air turbine starter are also monitored. For example, oil temperature is sensed by sensor 213 and communicated to the monitor data interface 232 over communications channel 224. Oil pressure is sensed by sensor 215 and communicated to the monitor data interface 232 over communications channel 226. In some embodiments, chip detectors may be employed to detect a larger than normal amount of metallic chips in the oil and conductivity sensors may be used to determine oil viscosity. Moreover, as is generally known, the output of the aircraft engine starter 206 is a shaft 209 exerting a torque on a load 212, which may be an aircraft engine (not illustrated). Thus, the shaft rotation may additionally be parameterized as to torque, speed, deflection, vibration, and torsion, to name a few examples. In the depicted embodiment, a torque sensor 210 senses torque and communicates the sensed torque data to the monitor data interface 232 over communications channel 228. The selected sensors and parameters and the number thereof are exemplary and are not intended to limit the present invention. The communications channels 220, 222, 224, 226, and 228 conventionally use wired connections but may be wireless or fluidic in some embodiments. While the aircraft accessory monitor 230 is depicted as discrete, the monitor 230, the memory 234, the processor 236, or any combination thereof may be at least partially integral to the aircraft engine accessory 206. In an alternate embodiment, one monitor may 230 serve for a plurality of aircraft engine accessories having associated sensors.

The data arriving at the monitor data interface 232 may be pre-processed to produce data that are useful to processor 236. For example, if the processor 236 and the memory 234 are electronic digital components, analog-to-digital conversion of raw sensor data may be performed as part of the monitor data interface 232 functions. Other conversions, such as the conversion of raw digital sensor signals into other digital signals representing parameters in conventional units may be performed in the monitor data interface 232. For example, shaft speed may be sensed as a rate of pulses caused by reflection of a diode laser light off a reflective strip on shaft 209. Conversion of the raw output pulses into units of revolutions per second may be performed in the monitor data interface 232. Alternatively, some data conversions may be performed by processing circuitry integral to the sensor. For example, some tachometers convert electrical pulses into revolutions per second or revolutions per minute. Some data conversions may take place in dedicated components (not shown) coupled in series with the appropriate communications channel. Still other data conversions may be performed in the processor 236. For example, some data analysis routines may use data representative of revolutions per second, others may use revolutions per minute, and conversion between those units may be performed in the processor 236.

The monitor data interface 232 transfers the data it receives onto the bus 233 automatically or on demand. The monitor data interface 232 may be designed for high-speed data acquisition and transfer. Increased speed in the data acquisition process may be accomplished by parallel data input or by interleaving time slots during which various communications channels are open. The monitor data interface 232 is preferably sized for real-time data rates for all sensors. In any of these cases, the data that is transferred onto the bus 233 may be stored in the memory 234 or processed immediately by the processor 236.

Memory 234 may be any of numerous conventional types and may be packaged discretely, integrated, or distributed, and is preferably at least partially non-volatile. Memory 234 may be partially read-only memory, and may include recordable removable media, such as CD-ROM or other disk, stick, card, or tape memory. Memory 234 is also preferably selected to survive the end-use operational environment. Memory 234 may be flash memory. Memory 234 is used to store, among other things, various types of real-time and model parametric data, including baseline parametric data, model parametric data, and operational models, if any. These data and models are discussed in more detail further below. A non-volatile portion of memory 234 may be attached to aircraft engine starter 206 as part of the aircraft accessory monitor 230, which itself may be attached to aircraft engine starter 206. Attachment of the memory 234 to the aircraft accessory 206 includes attachment to structural elements associated with the aircraft accessory 206, such as brackets, cowlings, fittings, and similar articles used to install an aircraft accessory 206. When the aircraft accessory 206 is installed or removed, it is preferred that the memory be automatically installed or removed with the accessory by virtue of attachment. In an embodiment where the aircraft accessory 206 is integral with the engine, the memory 234 may be attached to the engine or its inherently associated structures.

In addition to real-time parametric data, the memory 234 additionally stores data representative of a bill of materials for the accessory. These data are available for download through download interface 236, which may provide for burst mode data transfer to data customer 242. In some embodiments, memory 234 may be attached to the aircraft accessory 206 and connected by a data bus 233 to the remaining components of a remotely located aircraft accessory monitor 230. A data customer 242, which may be, for example, an aircraft mechanic or maintenance analyst, can download data when the aircraft is on the ground. Alternatively, the data customer 242 may retrieve the data by radio frequency communication while the aircraft is in flight. In some embodiments, the data customer 242 is an off-line processor that performs non-real-time analysis of the real-time data.

The processor 236 may be any one of various known processors and may be packaged discretely, integrated, or distributed, and should be sized and configured to handle real-time data processing loads. The processor 236 may be collocated with the memory 234 in the aircraft accessory monitor 230 or as a distributed part of the aircraft accessory monitor 230. The processor 236 may drive a reporter 240, such as a display, to provide analysis results to users. The reporter 240 may comprise other devices instead of, or in addition to, the display 240. For example, the reporter 240 may include audible alarms, flashing lights, instrument panel displays, emergency flight data recorder inputs, or voice messages to the pilot or ground personnel.

It will be appreciated that the aircraft accessory monitor 230 may be packaged discretely, integrated with the aircraft accessory 206, or distributed throughout the aircraft accessory 206. The aircraft accessory monitor 230 may be produced as a standardized unit and used for a wide variety of similar aircraft engine accessories 206 or may be customized to each aircraft accessory 206 and its particular operational environment.

Figure 3:
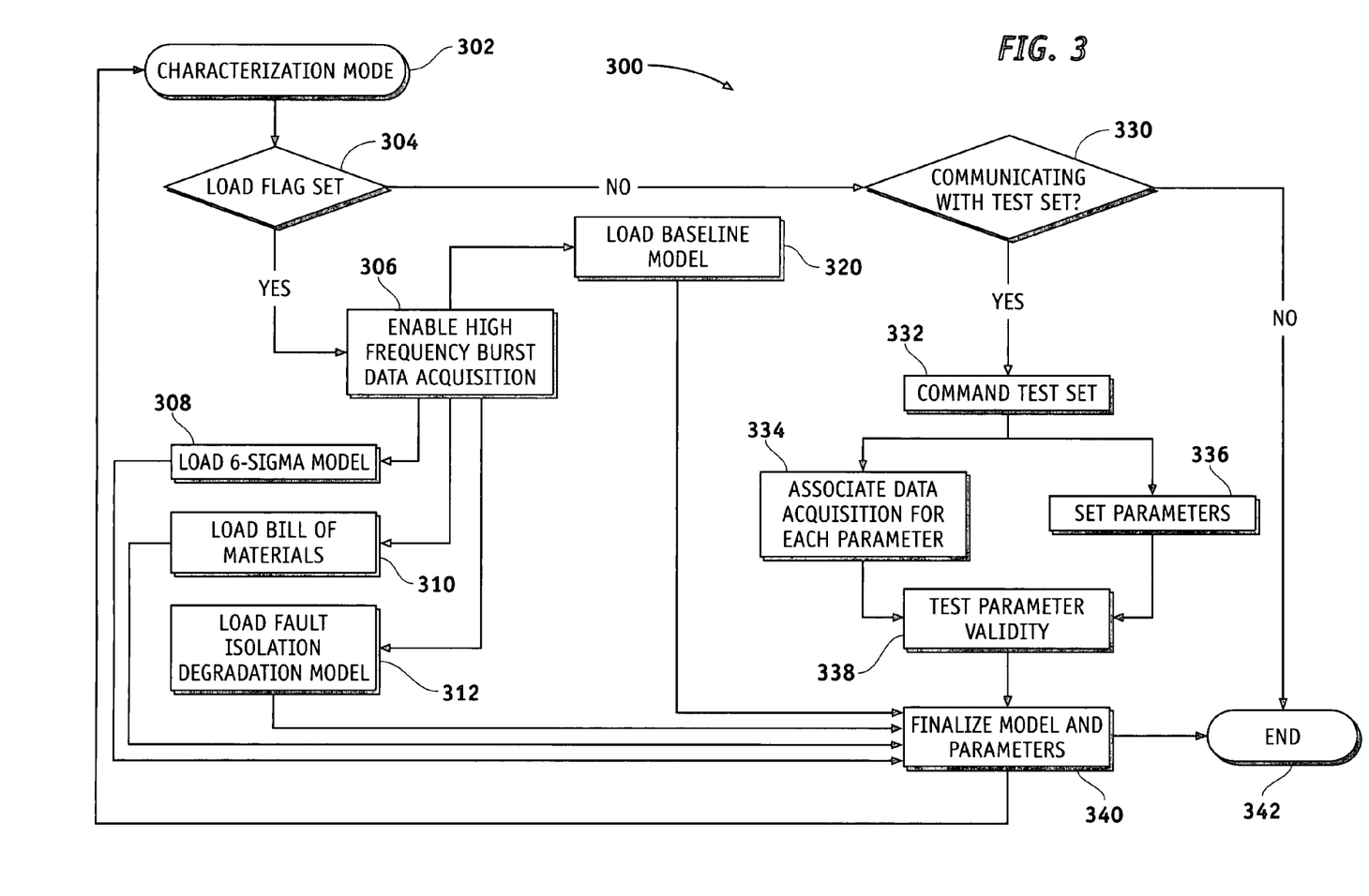
FIG. 3 is a process flow diagram for an exemplary characterization mode of an exemplary apparatus for monitoring an aircraft accessory.
Figure 4:
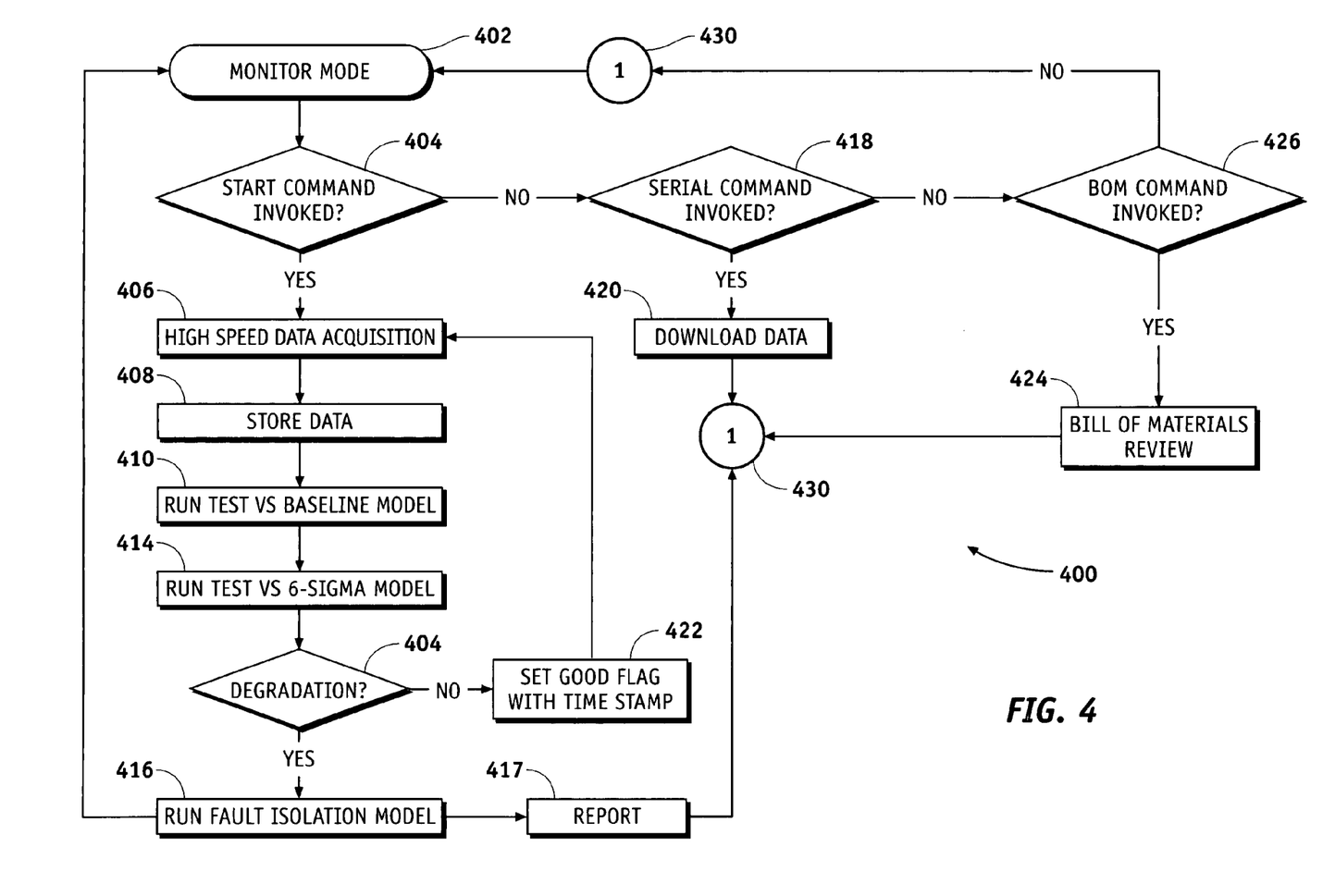
FIG. 4 is a process flow diagram for an exemplary monitoring mode of an exemplary apparatus for monitoring an aircraft accessory.

Having described the aircraft accessory monitor 230, and its interface to a particular accessory, a detailed description of the processes implemented by the aircraft accessory monitor will now be provided. In a particular preferred embodiment, the aircraft accessory monitor 230 may be operated alternatively in either a characterization mode 302 or a monitor mode 402. An overall view of an exemplary method of aircraft accessory monitoring 100 will be described first followed by more detailed description of the characterization mode 302, which is depicted in FIG. 3, and the monitor mode 402, which is depicted in FIG. 4.

Figure 2A:
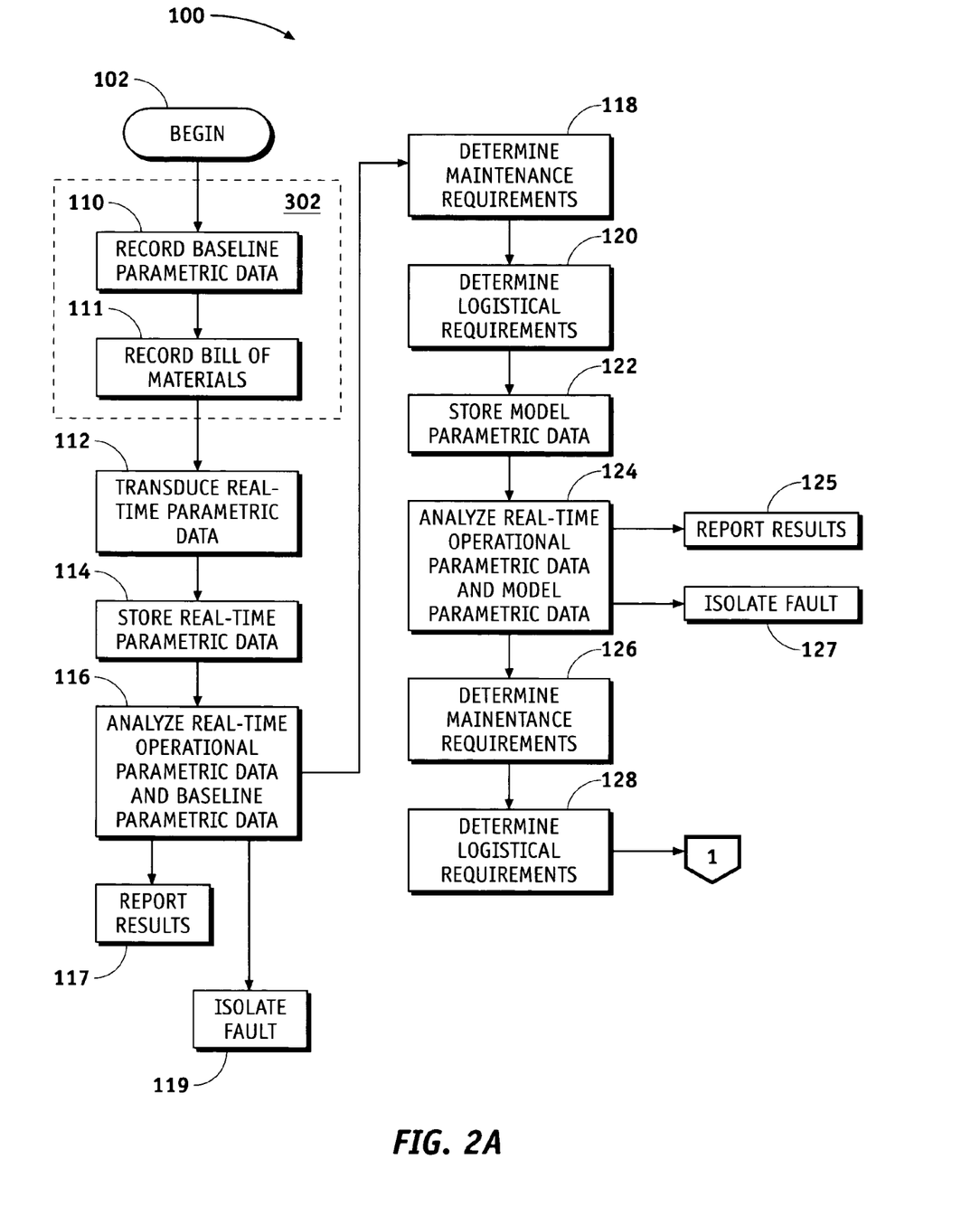
FIG. 2A is a partial block diagram of an exemplary method for monitoring an aircraft accessory.
Figure 2B:
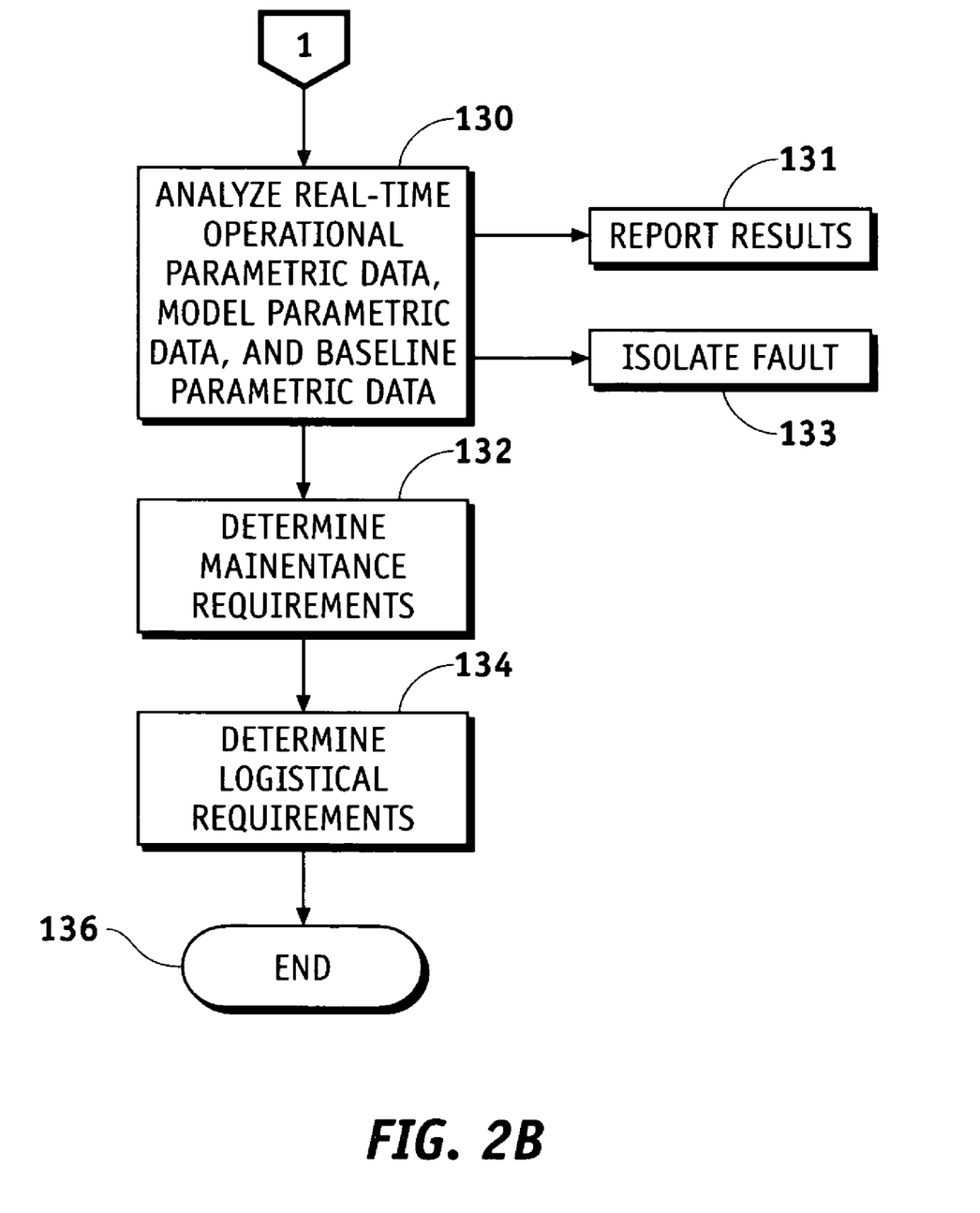
FIG. 2B is a partial block diagram of the exemplary method of for monitoring an aircraft accessory of FIG. 2A.
Figure 5:
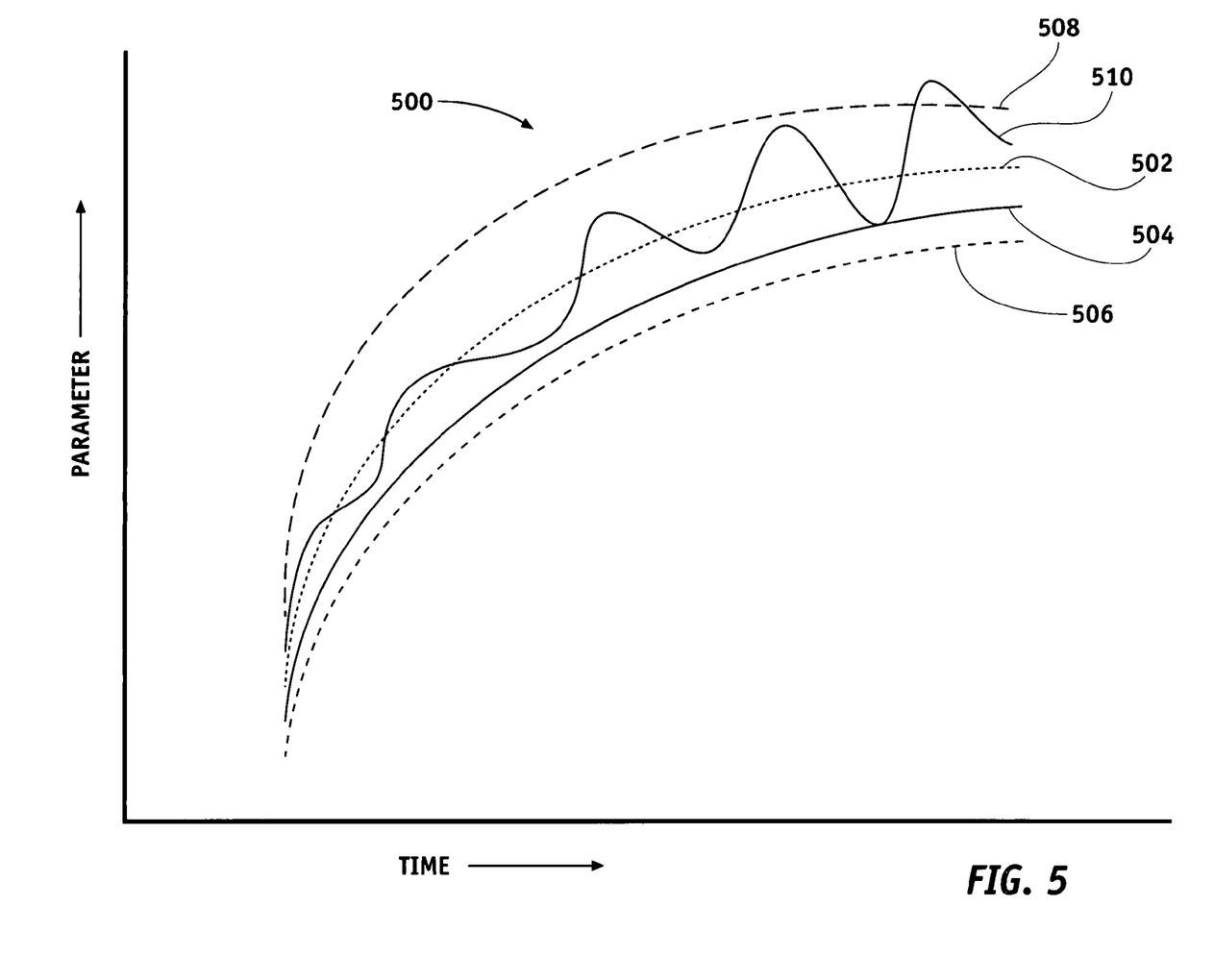
FIG. 5 is a graph of a parameter versus time for superimposing actual data and model data.

Turning now to FIGS. 2A and 2B, an exemplary method of aircraft accessory monitoring 100 according to an exemplary embodiment is depicted in flowchart form. The method 100 begins at step 102 the engine accessory monitor 230 depicted in FIG. 1 is energized. Though not explicitly depicted, step 102 when may include self-tests at start-up, such as one or more of a random access memory test, data acquisition self test, one or more sensor tests, and a test to determine if characterization has been completed. In this exemplary embodiment 100, the depicted method 100 proceeds with a characterization mode 302, which includes steps 110–111. The characterization mode 302 is described in more detail below. If the characterization mode 302 has been previously completed, it may not be necessary to perform the characterization mode 302 at each start-up, and in another exemplary embodiment, the completed characterization test result in step 102 may branch to a later step such as step 112. In step 110, baseline parametric data is recorded during an acceptance test procedure. Baseline parametric data 504, which is graphically depicted in FIG. 5, is data that describes the performance of the aircraft engine accessory, such as the aircraft engine starter at a particular point in time, such as when it is new or refurbished. The baseline parametric data 504 describes the system and provides a starting point from which wear and performance changes over time may be measured. The baseline parametric data is stored in the memory 234 associated with the air turbine starter 206 or other aircraft accessory. In some circumstances, the baseline parametric data may also be stored offline so that it can be re-recorded in step 110 after the contents of memory 234 has been compromised by adverse environmental effects.

In step 111, a bill of materials for the particular aircraft accessory is loaded into the non-volatile memory associated therewith. Each part making up the aircraft accessory may be listed in the bill of materials, along with specifications and dates of installation for lubricants and other elements that are replaceable in the operational environment, such as filters. The bill of materials data as to replaced elements may be updated in the field, and a history of the replacements may be maintained in the bill of materials. In a particular embodiment, the bill of materials may only be updated 111 at a predetermined factory as to factory-replaceable parts.

When the characterized aircraft accessory monitor is installed in an operational aircraft, step 112 collects real-time operational parametric data 510 (see FIG. 5) relating to the aircraft engine accessory 206 using engine accessory monitor 230. Step 112 begins the monitoring mode 402 of the aircraft accessory monitor, which is more fully described further below. In step 112, the aircraft accessory, with associated sensors, memory, and processor has been installed in an operational aircraft, and the sensors transduce real-time operational parametric data 510 as the aircraft accessory operates. The real-time operational parametric data 510 may parallel the baseline parametric data 504 recorded during the acceptance test procedures as to source and type. Preferably, the same sensors are used during normal operations as in acceptance testing.

In step 114, the real-time operational parametric data 510 is recorded in the memory 234. The recorded real-time operational parametric data 510 may be downloaded for further analysis, perhaps with the bill of materials and the baseline parametric data 504. In an alternate embodiment, step 114 may be omitted, and data analysis may be performed in near real-time and the analysis results recorded 114. In some embodiments, normative data is not stored 114 and only deviations from the norm are recorded 114. Hybrid data collection, where some data is saved by exception and some is saved by selection may also be employed. The real-time operational parametric data is preferably stored 114 in a format conducive to high-speed data transfer.

In step 116, the real-time operational parametric data 510 and baseline parametric data 504 are analyzed for relationships that may signal a need for operator or maintenance action. For example, an oil pressure exceeding a first predetermined limit may signal the need for operator attention. For further example, a prolonged event during which oil temperature exceeds a second predetermined limit may indicate the need for an early oil change. The analysis 116 of real-time operational parametric data contemplates a wide variety of analysis tools ranging from simple limit checks to Kalman filters and data mining. Each analysis method 116 may not have to be real-time, even though it operates on real-time data, because a plurality of analytical processes may be spawned; Analysis step 116 may take into account only data from one accessory, or may correlate data from a plurality of accessories on one engine, or on a plurality of engines.

In step 117, analysis results of immediate interest may be reported to a flight crew or other operator. The analysis result may be the primary information reported, or the real-time operational parametric data 510, perhaps graphed against time 500 as shown in FIG. 5, may be reported 117. Conventional means of data reporting, such as video displays, flashing lights, and audible alarms are contemplated within step 117. In step 119, analysis results may be used to initiate fault isolation procedures, which may include automatic determination of a failed component or a root cause determination using a diagnostic engine.

In step 118, maintenance requirements are determined based, at least in part, on the analysis of relationships between the baseline parametric data 504 and the real-time operational parametric data 510. For example, if a shaft rotational velocity shows particular variations, a bearing replacement may be indicated. Thus, maintenance which was formerly performed based on raw operational hours or calendar days may be made adaptive to actual maintenance needs, resulting in reduced downtime and costs and improved flight safety. Moreover, the bill of materials data may be used to determine maintenance requirements. For example, the real-time operational parametric data 510 may be associated with a part, or element on the bill of materials, to indicate what part in the aircraft accessory may need maintenance.

In step 120, logistical requirements are determined based, at least in part, on the analysis of relationships between the baseline parametric data 504 and the real-time operational parametric data 510. For example, an analysis 116 showing indications of premature bearing wear-out in an aircraft engine starter may indicate the need for a spare part. Correlation with similar starter bearings on other engines in the same aircraft may indicate that all of the starters on the aircraft have early bearing wear, requiring a plurality of spare parts. Off-line correlation with starter bearings in other aircraft with the same model starter may indicate, for example, a starter design problem, a bearing manufacturing problem, or merely that the aircraft is in service in cold weather and the bearing lubricant needs to be adapted for low temperature service.

In a simpler embodiment, step 120 may be the last step in the method 100. The exemplary method 100 was constructed to illustrate that the method includes analyzing real-time operational parametric data 510 relationships to baseline parametric data 504, and/or real-time operational parametric data 510 relationships to model parametric data 502, 506 and 508. However, a simpler embodiment ending at step 120 would analyze only real-time operational parametric data 510 relationships to baseline parametric data 504.

Step 122 includes storing model parametric data 502, 506 and 508 in the non-volatile memory. Step 122 may be done before step 112 as part of the characterization mode 302, but can be performed, repeated, or upgraded at any time. One of the preferred data models 502 is a six-sigma model, but other models may be used, adaptive to requirements. A six-sigma model is preferred. For example, a model based upon historical data may be useful for modeling wear of moving parts and a model extrapolated from a physics-based simulation may be useful for expressing expectations for a completely new device. The model stored in step 122 may stand alone 502 as a reference for real-time operational parametric data 510 or may be incorporated as limits 506 and 508 to either the baseline parametric data 504, the model parametric data 502, or both. In an alternate embodiment, more than one model may be used.

In step 124, relationships between baseline parametric data 504 and model parametric data 502, 506 and 508 are analyzed for indications of a need for operator or maintenance action. Analysis results from step 124 indicating a need for operator action may be reported directly to an operator or flight crew member in step 125. Analysis results from step 124 indicating a need for maintenance action may be stored in an onboard maintenance log, radioed to the maintaining organization, or printed out as part of a flight log in step 126. Analysis results indicating a fault may be provided as input to a fault isolation subsystem 127, which may use additional analysis results from steps 116 and 124 to isolate a faulty component.

In step 126, maintenance requirements may be determined from analysis of relationships between baseline parametric data 504 and model parametric data 502, 506 and 508. For example, model parametric data 502, 506 and 508 may include a parameter representing maintenance requirements as a function of operational time above a particular shaft rotation speed. The corresponding real-time operational parametric data 510 may be obtained from a tachometer coupled to a counter that activates above a selected or predetermined shaft speed. When a predetermined limit on shaft over-speed time has been exceeded, the cognizant maintenance organization is notified. For a less simple example, the predetermined limit on shaft over-speed time may be adjusted as a function of peak shaft drive torque and peak back-drive shaft torque to make the maintenance call earlier for highly stressed shafts.

In step 128, analysis results from step 124 are used to determine logistical requirements for parts and consumables. Wear and consumption models may be developed historically or prospectively from physics-based simulations. The need for spare parts and consumables, such as lubricants, filters, seals, and chemicals consumed during maintenance, can be specified as a function of the condition of the aircraft accessory. Baseline parametric data 504 may be compared with model parametric data 502, 506 and 508 to estimate the points in time when spare parts and consumables will be needed and the cognizant logistics organization may schedule acquisition of parts and consumables accordingly. A particular embodiment of the method ends with step 128.

In step 130, relationships between real-time operational parametric data 510, baseline parametric data 504, and model parametric data 502, 506 and 508 may be performed. There are many ways to combine the three data types for analysis. For example, six-sigma limits 506 and 508 from the model parametric data may be associated with the baseline parametric data 504 instead of the model parametric centerline data 502, to indicate when the aircraft accessory may be exceeding its particular limits. In a further example, the model parametric data 502, 506, and 508 may be used as a reference to smooth real-time parametric data 510 into an updated or additional operational baseline. Operational baseline data may then be compared with acceptance test baseline data 504 to identify weaknesses in acceptance test procedures.

Note that analysis results from steps 116, 124, and as discussed below, step 130, may provide data for making new models or improving old ones. In an alternate embodiment, at least one of the models represented by model parametric data 502, 506 and 508 may be self-updating. For example, a stream of data for a given parameter may be filtered to improve the original estimate of its curve 502, and the improved curve 502 may replace the previous version of curve 502. In most embodiments, step 130 may include step 116 and step 124 in a single analysis step 130.

Results of analysis step 130 may be reported to crew members or others in step 131. The step of reporting 117, 125, or 131 may include initiating alarms, as appropriate. If a fault, such as a parameter exceeding limits is found in step 130, fault isolation is initiated in step 133. Step 132 is similar to steps 118 and 124 and may provide additional information into maintenance requirements based upon the use of both model parametric data 502, 506, and 508 and baseline parametric data 504 with real-time operational data 510. Step 134 is similar to steps 118 and 124 and may provide additional information into logistical requirements based upon the use of both model parametric data 502, 506, and 508 and baseline parametric data 504 with real-time operational data 510. Exemplary process 100 ends at step 136. The pattern of steps for further analysis using additional models will be understood by those of ordinary skill in the art from the patterns of steps 116–122, 124–128, and 130–134.

As was noted above, steps 110 and 111 represent generally the process that is performed in the characterization mode 302. A descriptioin of this mode will now be provided in more detail. FIG. 3 shows a flow chart of the characterization mode 302. Characterization mode 302 may be used at the factory to acquire baseline parametric data 504, model data 502, 506 and 508, bill of materials data, and to couple to a test set during acceptance test procedures (ATP). The process 300 begins with the aircraft accessory monitor 230 being placed in characterization mode 302, by signal or manual switch. No matter the particular manner in which this mode 300 is reached, when it is, one or more acceptance test procedures are performed, which generate baseline parametric data 504. These baseline parametric data are stored, or recorded in the memory 234. It will be appreciated that the specific types of data that constitute parametric data may be different for each aircraft accessory and even each accessory model. For example, an aircraft engine starter, such as the one described above, may be parametrically described by shaft speed, shaft torque, turbine pressure, oil temperature, oil pressure, vane strain, and histories and extrema of each parameter, just to name a few. A valve, for further example, may be parameterized by actuation force, pintle position, and flow rate, as well as histories and extrema of each parameter. The baseline parametric data gathered and recorded during each acceptance test procedure is intended to remain with the aircraft accessory for the life of the aircraft accessory.

During the characterization mode 302, a bill of materials for the particular aircraft accessory is also loaded into the memory 234. Each part making up the aircraft accessory may be listed in the bill of materials, along with specifications and dates of installation for lubricants and other elements that are replaceable in the operational environment, such as filters. The monitor 230 may be configured such that the bill of materials data as to replaced elements may be updated in the field, and a history of the replacements may be maintained in the bill of materials. In a particular embodiment, the bill of materials may only be updated at a predetermined factory as to factory-replaceable parts.

If the load flag is determined to be set in step 304, then high frequency burst data acquisition 306 may be used to upload six-sigma model 308, to upload bill of materials 310, and to upload a fault isolation degradation model 312. In some embodiments, fewer models may be uploaded. In other embodiments, additional models may be uploaded. For example, a model derived from real-time operational data acquired by a predecessor aircraft accessory monitor 230 on a predecessor aircraft accessory 206 being replaced by the aircraft accessory monitor 230 which is in characterization mode 302 may be uploaded. Data relating to the structure of the baseline parametric data model 504, or baseline model 504, may be uploaded when the load flag is set. In some embodiments, the baseline parametric data model 504, may be loaded using high speed burst data acquisition 306. Likewise, in some embodiments, one or more steps 308, 310, 312, and 320 may be accomplished without using high speed burst mode data acquisition 306.

If the load flag is determined in step 304 to not be set, then step 330 determines if the aircraft accessory monitor 230 is communicating with a test set, such as a test set used for ATP. If not, then characterization mode ends at step 342. Otherwise, test set commands are entered by a user in step 332 for both setting parameters in step 336 and organizing data acquisition for the parameters set in step 334. In other embodiments, step 334 may follow step 336 linearly. In other embodiments, the parameters may all be set in step 336 and then different test set commands from step 332 may cause step 334 to be executed for all set parameters. The validity of the parameters set in step 336 and associated with data streams in step 334 may be tested in step 338 by verifying that each parameter has an associated data stream that does represent the parameter and that each desired parameter has been set. These parametric data streams may be used to fill in the structure of the baseline model 320 in step 340. The baseline model is based upon the data acquired during ATP, and provides parameters representing the actual performance of the specific aircraft accessory under test. The baseline model 320 may be associated with other models. For example, six sigma limits from the six-sigma model derived from previous tests of all similar aircraft accessories may be added to the baseline model 320 to provide an estimate of the six-sigma limits of the specific aircraft accessory under test. Any associations between models, such as associating six-sigma model limits with the baseline parametric model, may also be performed in step 340. After all models are finalized and the baseline model has been populated in step 340, process 300 ends at step 342, and the monitor mode 402 may be commenced.

As was noted above, steps 112–136 represent generally the process that is performed in the monitor mode 402. FIG. 4 shows a flow chart of the monitoring mode 402. Monitoring mode 402 is the normal operational mode of the aircraft accessory monitor 230. The process 400 begins with the aircraft accessory monitor 230 being placed in monitoring mode 402, by signal or manual switch. If step 404 determines that a start command has been invoked, sensors, such as pressure sensor 203, tachometer 211, oil temperature sensor 213, and oil pressure sensor 215 as shown in FIG. 2, are energized and high speed data acquisition of the real time data arriving at monitor data interface 232 begins in step 406. At least a portion of the real-time parametric data 510 may be stored in memory 234 as part of step 408. The portion of real-time parametric data 510 selected to be stored in step 408 may represent exceptional conditions, such as parameters out of limits, or may represent data focused on a particular parameter or group of parameters. The real-time parametric data 510 is tested against the baseline parametric data 504 in step 410. Step 410 may be a sub-step of step 116 or step 130. The real-time parametric data 510 is also tested against the model parametric data 502, 506 and 508 in step 412. Step 412 may be a sub-step of step 124 or step 130.

If real-time data or model comparisons indicate a fault in step 414, step 416 runs the fault isolation model in step 416. The fault isolation model is machine-executable logic which responds to real-time parametric data 510 and possibly other data to determine what component, part, or phenomenon caused the indicated fault. If no fault is detected, a data flag indicating the absence of a fault (e.g., a "good" flag) may be stored in memory 234 along with a time stamp in step 422. The periodicity with which the "good" flag may be set in step 422 may be set as a parameter in step 336. In some embodiments, the flag periodicity may be set in software that is used to operate the aircraft accessory monitor 230. After the "good" flag is set, process 400 continues at step 406.

If step 404 determines that the start command has not been invoked, step 418 determines if the serial command has been invoked. The serial command may be invoked by field maintenance workers or remotely by any data customer 242. If step 418 determines that the serial command has been invoked, data is downloaded in step 420 over the download interface 238. The downloaded data may include stored real-time operational data or model data, as selected by data customer 242. After the data download, process 400 continues through node 430 to step 402.

If step 418 determines that the serial command has not been invoked, step 426 determines if the bill of materials command, or BOM command, has been invoked. If so, the bill of materials may be downloaded over download data interface 238 or reported on display 240 at the option of data customer 242. After the BOM has been reviewed in step 424, process 400 continues through node 430 at step 402.

FIG. 5 shows a graph of an exemplary parameter against time. The graph superimposes one real-time parametric data stream 510 over baseline parametric data 504 and model parametric data 502 having upper and lower limits 508 and 506. The graph illustrates one parameter among a plurality of parameters and their associated baseline 504 and six-sigma 502, 506, and 508 models. Curves for other parameters may be substantially different from the depicted embodiment. For example, some parameters may be binary. Some curves may reflect a function of several parameters. Those of ordinary skill in the art of data analysis will appreciate the various forms that parametric curves may take. The depicted embodiment illustrates the relationships between parametric data from different sources and is not intended to limit the invention to the models 502, 506, 508, and 504 depicted.

Figure 6:
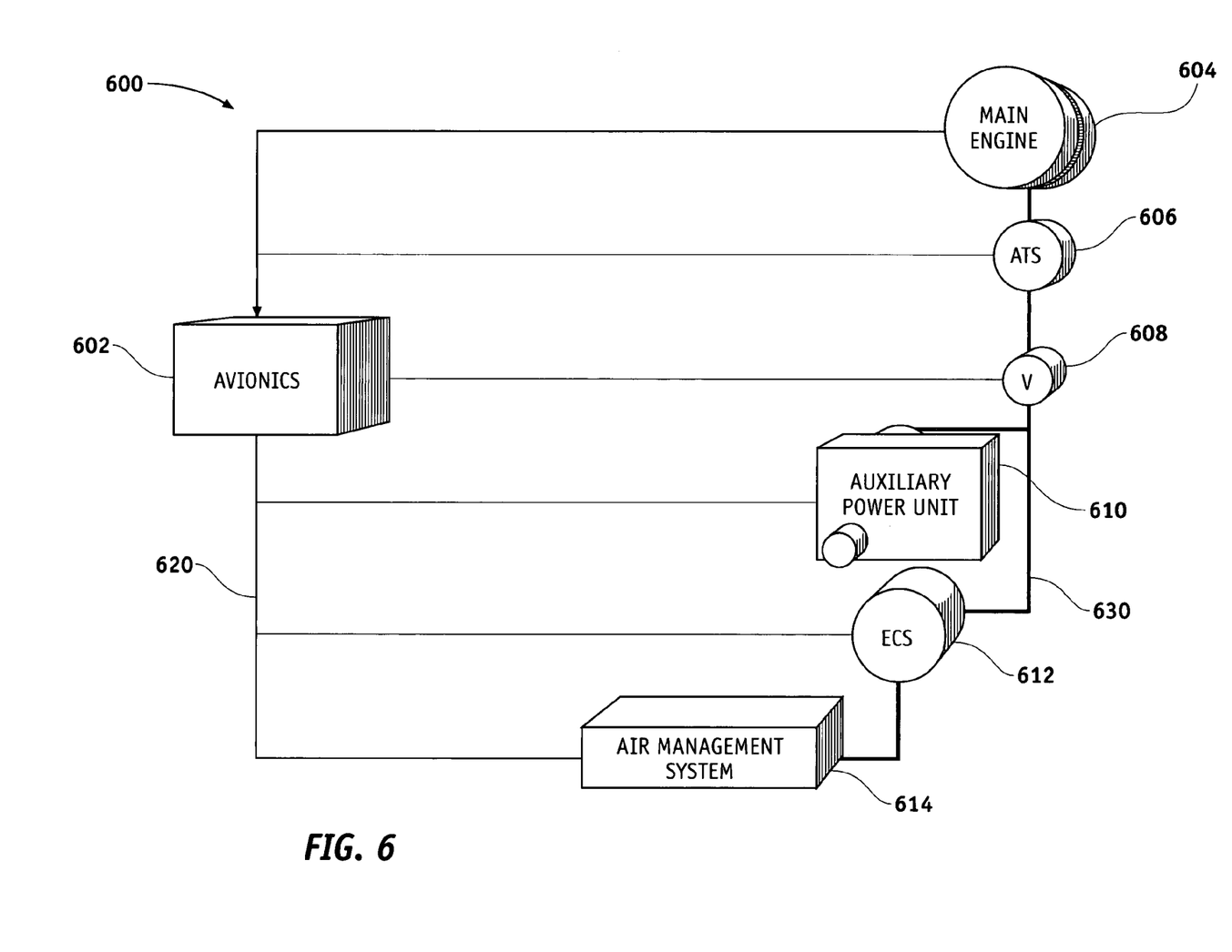
FIG. 6 is a block diagram of an avionics system adapted to monitor a plurality of aircraft accessories.

FIG. 6 shows a diagram of exemplary aircraft accessories supplying data along sensor communications links 620 (only one is labeled) to a centralized avionics system 602 which performs the role of monitor 230 in addition to other avionic functions. Aircraft accessories including main engine 604, air turbine starter 606, air turbine starter valve 608, auxiliary power unit 610, environmental control system 612, and air management system 614 may supply data from one or more sensors associated with each aircraft accessory to one or more processors and one or more memories in the avionics suite 602. Avionics suite 602 may be, for example, a Primus EPIC avionics suite manufactured by Honeywell, International of Phoenix, AZ. The aircraft accessories shown are not intended to be limiting. Other aircraft accessories, such as thrust reversers and actuators generally, may be connected to a centralized avionics suite. In alternate embodiment, each aircraft accessory may have a dedicated and possibly integrated monitor 230 which sends results of the monitoring process to the avionics suite 602 over communications links 620.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for monitoring an aircraft accessory comprising the steps of:
   sensing baseline parametric data during operation of the aircraft accessory during an acceptance test procedure, the baseline parametric data comprising data relating to aircraft accessory performance;
   storing said sensed baseline parametric data;
   sensing real-time operational parametric data;
   comparing the sensed real-time operational parametric data with the stored baseline parametric data;
   determining at least one relationship between the sensed real-time operational parametric data and the stored baseline parametric data;
   monitoring the determined relationship until one of the determined relationships signals aircraft accessory wear; and
   reporting the wear signaling relationship to an operator.

2. The method of claim 1, further comprising the step of storing a bill of materials for the aircraft accessory.

3. The method of claim 2, further comprising the step of associating the at least one relationship between the sensed operational parametric data and the stored baseline parametric data with at least one entry in the bill of materials.

4. The method of claim 2, further comprising the step of determining logistical requirements for the aircraft accessory based at least in part on the at least one relationship of the sensed operational parametric data to the stored baseline parametric data.

5. The method of claim 1, further comprising the step of storing the sensed real-time operational parametric data.

6. The method of claim 5, further comprising the step of downloading the stored real-time operational parametric data and the stored baseline parametric data to an external processor for off-line analysis.

7. The method of claim 1, further comprising the step of determining maintenance requirements for the aircraft accessory based at least in part on the at least one relationship between the sensed operational parametric data and the stored baseline parametric data.

8. The method of claim 1, further comprising the step of reporting data relating to the at least one relationship of the sensed operational parametric data to the stored baseline parametric data.

9. The method of claim 8, wherein the step of reporting data relating to the at least one relationship comprises the step of reporting data relating to a real-time deviation of sensed real-time parametric data from the stored baseline parametric data exceeding a pre-determined tolerance.

10. The method of claim 8, further comprising the step of isolating a fault based at least in part on the at least one relationship of the operational parametric data to the baseline parametric data.

11. The method of claim 1, further comprising the steps of:
    developing one or more parametric models of the aircraft accessory;
    determining at least one relationship between sensed real-time operational parametric data and each parametric model.

12. The method of claim 11, wherein one of the parametric models is a six-sigma parametric model of said aircraft accessory.

13. The method of claim 11, further comprising the step of downloading said parametric model and said recorded real-time operational parametric data for off-line analysis.

14. The method of claim 11, further comprising the step of determining at least one relationship of the real-time operational parametric data to each parametric model.

15. The method of claim 14, further comprising the step of displaying data relating to a relationship of the sensed real-time operational parametric data to each parametric model.

16. The method of claim 15, wherein the step of displaying data relating to a relationship of the sensed real-time operational parametric data to each parametric model comprises displaying data relating to real-time deviations of the sensed real-time operational parametric data from the parametric model exceeding a pre-determined tolerance.

17. The method of claim 11, further comprising the step of determining maintenance requirements for the aircraft accessory based at least in part on the at least one relationship of sensed real-time operational parametric data to each parametric model.

18. The method of claim 17, further comprising the step of associating the at least one relationship between the sensed real-time operational parametric data and the parametric model with at least one entry in a bill of materials.

19. The method of claim 17, wherein the step of determining maintenance requirements further comprises determining at least one relationship of the sensed real-time operational parametric data with the baseline parametric data.

20. The method of claim 11, further comprising the step of determining logistical requirements for the aircraft accessory based at least in part on the at least one relationship of the sensed real-time operational parametric data to the model parametric data.

21. The method of claim 20, further comprising the step of associating the at least one relationship between the sensed real-time operational parametric data and the parametric model with at least one entry in the bill of materials.

22. The method of claim 20, wherein the step of determining logistical requirements further comprises determining at least one relationship between the sensed real-time operational data with the baseline parametric data.

23. An apparatus for monitoring an aircraft accessory, comprising
  memory having stored therein at least baseline parametric data that was obtained during an acceptance test procedure, the baseline parametric data comprising data relating to aircraft accessory performance;
  a sensor configured to sense a physical parameter associated with the aircraft accessory and operable to supply a sensor signal representative thereof;
  a reporter configured to provide a signal to a user; and
  a processor coupled to receive the sensor signal and in operable communication with the memory and the reporter, the processor configured to (i) selectively retrieve the baseline parametric data from the memory, (ii) produce operational parametric data from the sensor signal, (iii) compare the operational parametric data with the baseline parametric data, to thereby determine a relationship there between, (iv) monitor the determined relationships until one of the determined relationships signals aircraft accessory wear, and (v) provide a command to the reporter to signal the aircraft accessory wear to the user.

24. The apparatus of claim 23, further comprising software residing in the memory and executable on the processor to determine relationships between the operational parametric data and the baseline parametric data in real-time.

25. The apparatus of claim 23, further comprising model parametric data residing in the memory, said parametric model relating to the aircraft accessory.

26. The apparatus of claim 25, wherein the parametric model comprises parametric data for a six-sigma model of the aircraft accessory.

27. The apparatus of claim 25, further comprising software residing in the memory and executable on the processor to determine at least one relationship between real-time operational parametric data and the parametric model.

28. The apparatus of claim 27, further comprising software residing in the memory executable on the processor to analyze the real-time operational parametric data, the parametric model, and the baseline parametric data to determine maintenance requirements relating to the aircraft accessory.

29. The apparatus of claim 27, further comprising software residing in the memory executable to analyze the real-time operational parametric data, the parametric model, and the baseline parametric data to determine logistical requirements relating to the aircraft accessory.

30. The apparatus of claim 23, wherein said sensor is integral to said aircraft accessory.

31. The apparatus of claim 23, wherein said memory is integral to said aircraft accessory.

32. The apparatus of claim 23, wherein said apparatus for monitoring is integral to said aircraft accessory.

* * * * *